INVENTOR.
JEROME H. LEMELSON

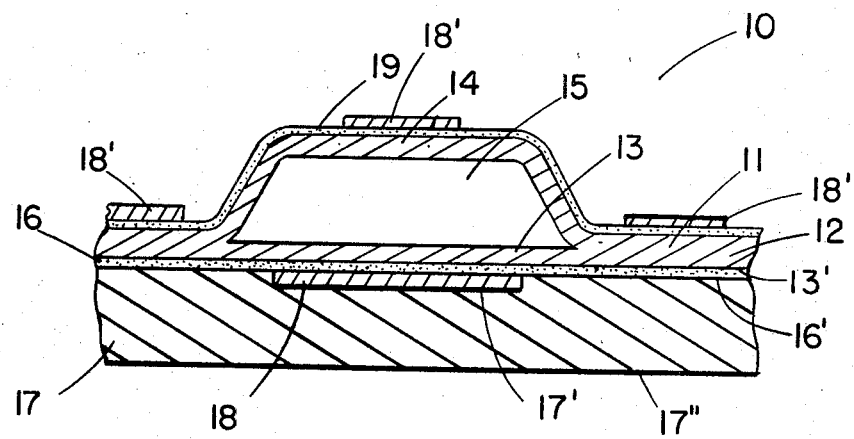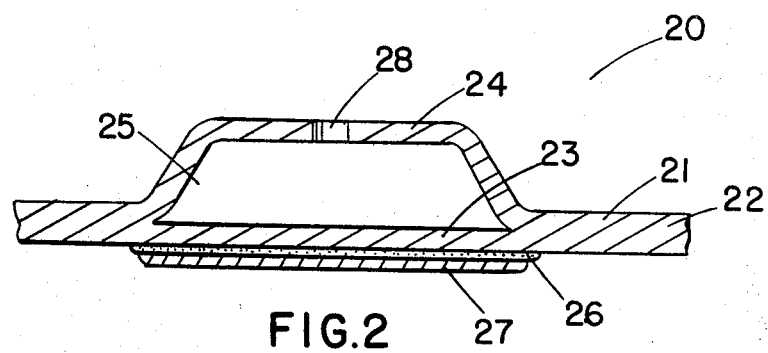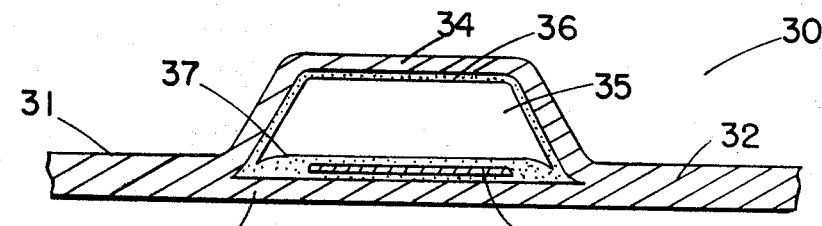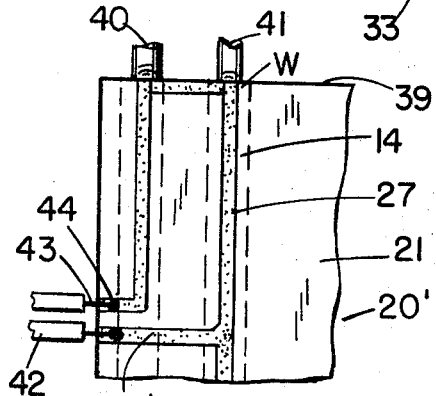

United States Patent Office 3,529,987
Patented Sept. 22, 1970

3,529,987
METHOD OF COATING CONDUIT
Jerome H. Lemelson, 85 Rector St.,
Metuchen, N.J. 08841
Continuation-in-part of application Ser. No. 432,033,
Nov. 25, 1964. This application Nov. 1, 1966, Ser.
No. 601,259
Int. Cl. H05b 1/00, 3/00
U.S. Cl. 117—21                          6 Claims

ABSTRACT OF THE DISCLOSURE

A method for providing a coating on the inside of a conduit for the purpose of protecting the conduit from chemical corrosion and, in certain instances, physical erosion. Coating is effected by predeterminately flowing a fluid through the conduit and causing same to deposit on or effect a change in the composition of the inside surface of the conduit until a desired degree of thickness of coating material is attained. When said condition is attained, the excess fluid which is still within the conduit, is purged from the interior of the conduit and the material coating same is totally solidified or set. In one form, the coating material is a molten polymer which solidifies upon contact with the surface of the conduit as it cools. In another form, the coating material is a monomer which is polymerized in situ on the inside surface of the conduit. In still another form, the inside surface of the conduit is provided with an outside layer by providing the material injected into the conduit as an oxidizing fluid and causing same to oxidize the inside surface of the conduit.

RELATED APPLICATIONS

This is a continuation-in-part of application Ser. No. 432,033 filed Nov. 25, 1964, now U.S. Pat. 3,414,863 for Electrically Conducting Panel which issued on Dec. 3, 1968, and having as a parent application Ser. No. 389,848 filed May 28, 1956, for Ducted Sheeting Construction now U.S. Pat. 3,166,829 issued Jan. 26, 1965.

This invention relates to improvements in the construction of heat transfer panels and methods of fabricating same. In particular the invention relates to a heat transfer panel containing means for cooling and/or heating a heat transfer fluid flowed through the panel and/or adjacent thereto.

Metal and ceramic panels have been utilized for the walls of various structures such as molds, ovens and other enclosures including the bodies of vehicles and equipment exposed to ambient extreme changes or variations in temperature. Most of the panel structures of the prior art utilized for heat transfer purposes are relatively complex assemblies requiring many fabricating operations and hence are relatively costly to fabricate and difficult to maintain. It is accordingly a primary object of this invention to provide a new and improved method of coating the inside of a conduit.

Another object is to provide new and improved methods for fabricating composite panels applicable for use in environments of extreme temperatures.

With the above and such other objects in view which may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is an end view in cross section of a fragment of a heat transfer panel made in accordance with the teachings of this invention.

FIG. 2 is an end view in cross section of a modified form of panel made of composite material and showing means for electrically heating fluid carried by the panel and means for dispensing said fluid and FIG. 3 is a cross sectional view of a modified form of ducted panel in the realm of the invention. FIG. 4 is a plan view of a fragment of the ducted panel of FIG. 2.

Figure 5:
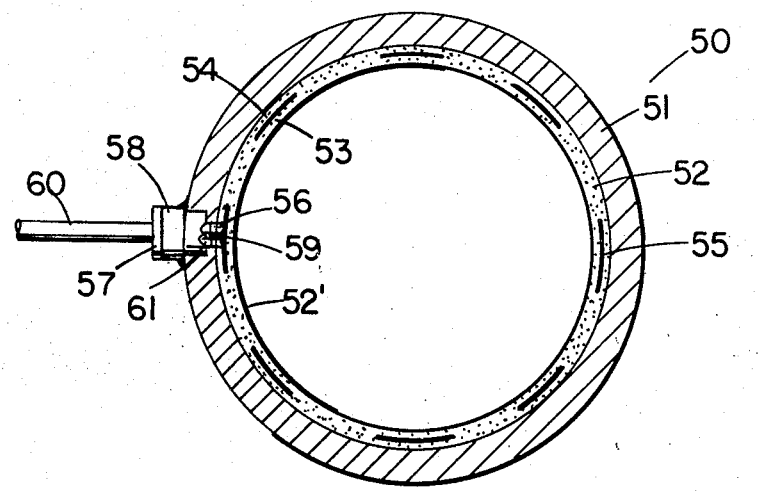
FIG. 5 is a cross sectional view of a cylindrical conduit containing features of the invention.

There is shown in FIG. 1 a heat transfer panel 10 comprising a composite assembly of a ducted panel 11 and a plurality of layers 16 and 17 of materials to be described which are integrally bonded or welded together in sandwich assembly with the panel 11. The ducted panel 11 may be made in accordance with the teachings of my said copending application wherein a pattern of stop-weld material is disposed on a first sheet of metal such as aluminum which sheet is thereafter hot rolled against a second metal sheet in a manner to weld the two sheets together save in the area covered by the stop-weld material which defines a strip-like volume which is capable of being expanded to form one or more conduit formations, such as 14, which may be utilized for conducting heat transfer liquid. In another technique, the incorporation of strips of friable material into a metal billet to be rolled into sheet form results in the provision of flat, non-welded strip-like interfacial volumes in the eventually rolled sheet which volumes may be expanded by fluid pressure to form the duct or conduit therein. Reference is made to U.S. Pat. 3,098,290 and to my copending application Ser. No. 641,101 now U.S. Pat. 3,173,195 entitled Method of Making Ducted Panelling, for techniques for manufacturing a panel having one side flat and one or more conduit formations extending from the other face such as the panel member 11 of FIG. 1. Other methods may also be provided for forming panels of the type illustrated and defined by notation 11 including deforming a first sheet of metal and pressure welding or otherwise bonding said sheet to a second flat sheet.

Notation 12 refers to that portion of panel 11 disposed between deformed conduit portions 14 and notation 13 refers to that portion of the panel 11 which is flat and defines a wall of the passageway 15 in the conduit portion 14 of the panel.

After the ducted panel or sheet 11 is formed, a coating or sheet 16 of ceramic material such as porcelain, Pyroceram cement or other suitable insulating material is fused or bonded to the rear face 13' of 11 and preferably set and fused thereagainst by heat applied thereto.

Illustrated in FIG. 1 is a strip 18 of electrically conducting material such as a resistance heating element shown disposed against the rear face 16' of layer 16 of insulating material and in alignment with the conduit formation 14. The strip or bar element 18 may be formed directly on surface 16' of layer 16 by deposition or may be provided as a separate strip bonded thereto by means of a suitable ceramic adhesive or during the fusion and solidification process when the layer 16 is fired or heated. Such strip 18 may be provided in the desired contour or pattern so as to follow the conduit formation 14 throughout the sheet or may be disposed across or longitudinal to only selected portions of said conduit. Conversely, the element 18 may be metal such as copper utilized to carry high voltages operative to heat same while the heat transfer fluid carried in the volume 15 of the conduit formed in sheet 11 may be utilized to transfer heat from the element 18 during its operation so as to maintain its temperature constant.

Notation 17 refers to insulating material which has been preformed as a panel or is deposited on the lower surface 16' of layer 16 over the resistance heating element 18 and bonded or heat fused in sandwich assembly to the surfaces of insulating layer 16 and element 18. The material comprising layer 17 may be the same material comprising layer 16 or a different material deposited thereon or previously formed and abutted thereagainst.

A further layer 19 of insulating material is also shown disposed against the upper surface 11' of the panel or sheet 11 and is operative to protect same from heat corrosion or erosion, chemical attack, etc.

The member or layer 17 may also comprise a structural member, plate or sheet of any suitable material which has been rolled, cast, machined, forged or extruded to its desired shape and forms the load bearing portion or wall of an article of manufacture such as a furnace, mold or vehicle containing the ducted panel 11 in assembly therewith which panel is utilized for heat transfer purposes. If the resistance heating element or conductor 18 is utilized in such a structure in which the layer 17 is made of metal, said element 18 may be insulated from metal member 17 by a suitable insulating material such as that comprising the layer 16 disposed between 18 and the surface or surfaces of 17 aligned with element 18. Conducting element 18 may be deposited or bonded within a recess or channel 17' provided in member or layer 17 as illustrated or deposited on a layer of insulating material (not shown in FIG. 1) disposed between element 18 and 17 on the flat upper surface of metal panel portion 17.

Other variations in the panel structure illustrated in FIG. 1 include the provision of one or more strips of conductors or resistance heating elements such as 18 embedded within the layer or plate 17 or disposed on the lower surface 17'' thereof or within the insulating layer 16 or against the outer surface of panel 11. Notation 18' refers to strips of metal or resistance heating material bonded to the outer surface of the insulating layer 19 which coats the outer surface 11' of panel 11. Such strips 18 are shown disposed adjacent to the conduit portion 14 although they may also be provided on the insulating material coating said conduit portion.

In FIG. 2 is shown a panel structure 20 including a ducted panel 21 of the type provided in FIG. 1 defined by portions 22 comprising a flat sheet of metal and conduit portions 24 formed by inflating or otherwise deforming portions of the sheet 21 and defining one or more passageways 25 in the sheet. The passageway 25 is shown having a flat wall 23 adjacent the deformed wall 24 of the conduit. Coating the outside surface of flat wall 23 is an insulating material 26 and integrally bonded to the outer surface 26 is a conductor strip 27 such as a resistance heating element. Provided along wall 24 are a plurality of through and through holes 28 which may be utilized for flowing a liquid or gas pumped through the passageway 25 into the volume immediately surrounding the panel 20 for heat transfer or other purposes. For example, the assembly 20 may be utilized as a wall panel or part of a wall panel, radiator or the like for heating a room. If the strip member 27 is an electrical resistance heating element which extends for a substantial distance along the length of the conduit 24 and is electrically energized, it may be utilized to heat a fluid such as air blown or pumped through the passageway 25 so that upon ejecting said heated air through the plurality of holes or slots 28 in wall 24, it may be utilized for heating the surrounding air and to maintain same at a desired temperature. The panel assembly 20 of FIG. 2 may also be utilized for heating other assemblies to which it is secured such as composite panel members having one or more plates or sheets fastened to either or both sides of the assembly 20. If a cold liquid or gas is pumped through passageway 25, it may be utilized for cooling the atmosphere or a member disposed adjacent thereto by flow of said coolant fluid through the plurality of openings 28. Hot liquid pumped through passageway 25 may also be sprayed through openings 28 for heating the surrounding atmosphere or structures, or the panel 20 may be utilized as a component of a manufacturing apparatus such as a chemical apparatus whereby one or more passageways of the type illustrated may be provided for introducing, mixing and heating or cooling different liquids and/or gases.

Certain features of the structure illustrated in FIG. 1 may be combined with that in FIG. 2 as may features of the structure 20 of FIG. 2 be combined with that of FIG. 1 without departing from the spirit of the invention.

FIG. 3 illustrates another form of the invention in which an electrical conducting strip 38 is provided within the volume defined by deforming portions of a sheet of metal which define a passageway therein of the type hereinabove described. The panel structure 30 includes a sheet of metal 31 having a conduit portion 34 provided or formed therein as described and defining a passageway 35 through which a heat transfer fluid may be flowed. Notation 32 refers to flat portions of the sheet 31 disposed between or adjacent to the deformed portions thereof and 33 refers to the flat portion of the sheet aligned with the passageway 35. Lining the interior of the passageway 35 and integrally bonded to the inside surfaces of sheet portions 33 and 34 is an insulating material 36 such as porcelain or other suitable ceramic, thermoplastic or thermosetting resin or the like. For example, the material of layer 36 may comprise any suitable ceramic frit, alumina, boron, etc. Such material 36 may be coated on the inside surface of the conduit 34 after the formation by flowing said material as a liquid through the conduit and solidifying same in situ against the surfaces which it wets. It may also be coated on suitable portions of the original sheets of metal of which conduit panel 31 is originally formed.

Notation 37 refers to that portion of the coating 36 which is disposed against the inside surface of the portion 33 of panel 31 and notation 38 refers to a strip of metal or resistance heating element disposed within layer 37. Resistance heating element 38 may also be integrally bonded to the upper surface of layer 37 or the outer surface of any other portion of the insulating material 36 coating any of the walls of the conduit portion of panel 31.

The panel 30 may be utilized in a number of manners. For example, if element 38 is a resistance heating element, it may be electrically energized and utilized to heat a gas or liquid flowed through passageway 35 and a plurality of such conduits provided in a single sheet of metal may be utilized, if similarly heated to raise the temperature of a substantially large volume of gas or liquid for heat transfer or chemical reaction purposes. If element 38 embedded in or bonded to the surface of layer 37 of insulating material within the conduit is an electrical conductor connected in an electrical circuit of sufficient energy to substantially heat said element during the conductance of current therethrough, a gas or liquid flowed through passageway 35 may be utilized to maintain the temperature of element 38 substantially constant during its operation.

It is also noted that the structure 30 illustrated in FIG. 3, or modifications thereof, may be utilized to advantage in the fabrication of electrical apparatus such as panel boards, bus-bars, high-power devices and the like. Rapid fabrication of such devices may be effected by means of roll-bonding techniques employing two or more sheets of metal which are selectively coated with insulating material and assembled with one or more conducting strips or bars as illustrated. It is noted that the internally mounted conducting strips 38 are securely maintained within the panel and need no auxiliary insulating means other than the coating 36 disposed against the inside surface of conduit portion 34 of the panel 31. The panel 31 simultaneously provides the conduit portion 34 with excess volume 35 operative to serve as a passageway for coolant fluid and maintain same immediately adjacent the conductor 38. The panel 30 therefore serves a plurality of functions including its use as a support for the conductor 38 and insulation means therefore as well as means for guiding and distributing heat transfer fluid immediately adjacent the conductor during its operation.

FIG. 4 illustrates a portion of a panel 20' having features of any of the panel sttructures illustrated in FIGS. 1 to 3. Additional features shown in FIG. 4 include means for connecting to the electrical and fluid conduit means of the panels illustrated in cross section. The sheet 21 is provided with a plurality of fluid conduit portions 14 shown extending parallel to each other and terminating at an edge 39 of said sheet. The deformed wall portions of the conduit portions 14 extend from the blind face of the sheet portion illustrated and their lateral boundaries are illustrated in dashed line notation. Disposed against the face of the sheet which is flat and corresponds, for example, to face 13' of panel member 11 of FIG. 1, are a plurality of electrical conducting strips 27 of the type described and each insulated from the sheet 21. The conducting strips 27 extend parallel to and in alignment with respective of the conduit formations 14 in the sheet 21 and are connected to each other in series. Respective electrical leads 42 have their wires 43 welded or soldered at 44 to respective end portions 27' of the strips 27 for connecting said strips to a source of electrical energy. Each of the two illustrated conduit formation 14 are shown with respective pipes or tubes 40 and 41 secured to the walls of the conduit formations in sealing engagement with the edge portions of the sheet defined by said conduit formations. If conduit formations 27 are interconnected further along the sheet, tube 40 may be used as an inlet for fluid to be pumped through the sheet and tube 41 as an outlet form the outflow of fluid from the sheet. Both tubes 40 and 41 may be inlets to respective conduit formations in the sheet if holes or slots are provided in either or both walls of the conduit formations in the sheet 21.

In FIG. 5 is shown a modified form of the invention wherein a heat transfer conduit 50 is made of composite materials as described and is in the shape of a cylindrical pipe or tube. The cylindrical wall of the conduit 50 includes an outer wall portion 51 made of metal such as aluminum, copper, steel or other suitable metal. Said outer wall may also comprise a non-metallic material such as ceramic material, glass or synthetic polymer. Provided against the inside surface of the cylindrical outer conduit 51 is a cylindrical inner conduit portion or formation 52 made of a dielectric material and having embedded therein a plurality of electrically conducting strips 55 which preferably run the length of the pipe 50. The strips 55, in a preferred form of the invention, are electrical resistance heating elements applied to the cylindrical formation 52 of dielectric material during the formation thereof. Accordingly, the cylindrical formation 52 may be fabricated by extrusion or spray coating on the interior surface of the powder cylinder 51 as a plurality of cylindrical layers or strata, a first 53 of which is first disposed against the inside surface of conduit 51 and, after the conducting strips 55 are disposed against the inside surface of the layer 53, layer 54 is thereafter applied over strips 53 and the surrounding dielectric material so as to completely encapsulate the strips within the formation 52 of dielectric material.

The conducting strip formations 55 may be fabricated of any suitable electrically conducting metal or resistance heating material which is applied by one or more techniques including (a) feeding a plurality of preformed formations of said strips against the layer 53 of 52 as or after said layer is applied to the inside surface of pipe 51 by extrusion, spraying, roller coating, fluidized bed means or other suitable technique, (b) extrusion of strips 55 directly on layer 53 or into the total formation 52 as it is extrusion formed, (c) extrusion coating of electrically conducting or resistance heating element material as a plurality of strip formations on the inside surface of layer 53, (d) roller coating of said strips, in situ on the surface of layer 53 after which layer 54 is applied thereto, (e) spray coating of the strips onto the surface of layer 53 or applied by other suitable techniques. Notation 54' refers to the inside surface of the conduit 50 illustrated in FIG. 5 which may comprise the surface of the dielectric layer 52 or any suitable material coated thereon. The surface 54' is in direct contact with fluid contained within or conducted by the pipe 50 and, since the conducting strips are in heat transfer relationship with the dielectric material 52, a substantial amount of heat generated thereby will be transferred to the fluid within the pipe for heating same, maintaining same in a fluent or viscous state or the performance of other desirable functions.

In a modified form of the invention illustrated in FIG. 5, a single conducting strip 55 may be encapsulated within the layer 52 and have any suitable width. In other words, the narrow conducting strips may be replaced by one or more extending a substantial distance around the cylinder including one which completely circumscribes the interior volume defined by the surface 54' for transferring heat to the fluid disposed therein.

Also illustrated in FIG. 5 is a means electrically connecting a source of electrical energy to one of the conducting strips. Said means includes a connector 57 having a head 58 through which extends a conducting pin 59 which protrudes beyond said head and is connected to a wire 60 which extends from a source of suitable electrical energy. A hole 56 is first drilled through pipe 50 and at least a portion of the dielectric material 52 so as to expose the surface of the conducting strip 55. The connector 57 is then applied above the hole and made to abut the outer surface of pipe 51 with the pin 59 protruding therefrom in abutment with the surface of conducting strip 55. Frictional abutment may be sufficient to cause an electrical connection to be made between pin 59 and strip 55 or other suitable means such as the application of solder, welding or other conducting means between pin 59 and conductor 55 may be applied to effect a good electrical connection. A portion of head 57 which is made of an insulating material preferably surrounds that portion of the pin 59 which penetrates hole 56 to insulate said pin from the material of outer pipe 51. The head 57 may be frictionally or threadably engaged in the hole 56 or may be welded or bonded to member 51 to retain same in place to effect an electrical and mechanical connection with the pipe 50.

Figure 6:
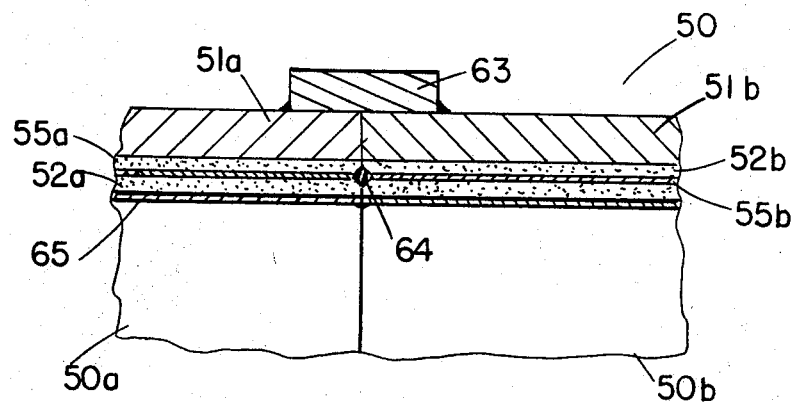
FIG. 6 is a fragmentary view of a portion of a conduit containing features of the invention.

FIG. 6 illustrates a portion of two sections of pipe of the type illustrated in FIG. 5 abutting each other in a manner to effect both a fluid seal at the joint and an electrical connection. A weld ring 63 or other suitable coupling may be applied across the ends of pipe members 50a and 50b to retain same together. In the fabrication of the ends of the pipe, those portions of the dielectric layers 52a and 52b which abut each other may be suitably recessed to receive a circular solder preform 64 or copper ring shown electrically soldered or welded to the conducting strips 55a and 55b of the respective pipe assemblies 50a and 50b. Induction heating may be used to effect the melting or soldering of the circular preform 64 to bond or weld the material thereof to the two conducting strip portions 55a and 55b. In joining the two pipe members 50a and 50b an induction or flame heating tool may be used to simultaneously weld the ends of metal formations 51a and 51b of both pipes and effect electrical connection between conducting strip elements 55a and 55b by melting and soldering or welding the preform 64 to both conducting strips.

Variations in the conduit construction illustrated in

FIG. 6 include the provision of a material 65 lining the inside surface 52' of the dielectric material and defining the inside surface of the pipe or conduit. Such lining or coating 65 may comprise, in a preferred form of the invention, a suitable corrosion resistant material such as a polymer of suitable thickness provided to protect the dielectric material from chemical and or physical corrosion or erosion resulting from contact with the fluid carried by the conduit. The material comprising layer or coating 65 may also be a suitable ceramic, glass or metal. If utilized as a metal said material layer 65 may comprise a resistance heating element, conventional electrical energy conductor or electrode. As a heating element, layer 65 may partially or completely coat the inside surface of the conduit to provide direct contact heating of fluid in the pipe. As an electrode or conductor, lining 65 may be disposed as one or more bands against the dielectric layer for charging or conducting electrical energy to the fluid in the conduit or effecting a glow discharge therein.

The coatings provided on the interior surfaces of the fluid conduits of FIGS. 3, 5 and 6 may be applied by a number of other techniques with or without the inclusion of said electrically conducting elements for the purpose of rendering the inside surface of the conduit corrosion resistant as well as electrically insulating. For example, the following techniques are herein proposed and form part of this invention:

(I) The coating layer 37 or 52 may be provided as a plastic polymer which is deposited in situ against the entire inside surface of the conduit from a molten or solution state. The molten polymer or polymeric solution may be injected through a nozzle or other means disposed in an opening in the conduit and retained within the conduit while a suitable layer thereof solidifies on or deposits in situ on the wall of the conduit whereafter excess liquid material is removed from the conduit or flowed continuously through the conduit and out on opening thereto such as the other end of the conduit while the wall of the conduit is cooled to effect solidification of the polymer closest to the wall until the desired coating thickness has formed thereon after which the flow of polymer is terminated and excess liquid purged from the core volume of the conduit with air or other means preferably injected through the inlet nozzle. Wall thickness control may be effected by proper timing and temperature regulation of the polymer and conduit wall during the process and/or by measuring the thickness of the solidifying material during the coating process such as by means of radiation or ultrasonic detection means and terminating the flow of material or initiating its removal from the conduit when the desired thickness of coating has deposited or solidified thereon.

(II) In the application of heat setting coating materials such as thermosetting resins, ceramic materials and the like to coat the described conduits, the walls of the conduit may be heated by induction or radiant heating means or by inserting the conduit pipe or tubed sheet into a hot liquid such as a molten salt bath while the coating material is contained within the conduit so solidify and set same to a desired thickness on the inside surface of the wall of the conduit. The procedure may be effected as described by either completely filling and retaining liquid or particulate coating material in the conduit until the desired portion thereof has set against the heated wall of the conduit or flowing said material continuously through the conduit from an inlet to an outlet thereto while the coating material heat sets against the wall of the conduit and continuing such procedure until the desired coating thickness has been attained. Thereafter, excess coating material is purged therefrom.

(III) In another technique, the coating material may comprise a monomer injected into the conduit to fill same per se or continuously flowed through the conduit continuously while a portion thereof is polymerized against the inside surface of the wall of the conduit. Such polymerization may be effected by heating the conduit wall from the exterior thereof, by irradiating said conduit wall and the monomer immediately adjacent said wall or by glow discharge means. Liquid monomers of various known synthetic plastics may be made to fill or flow through the conduit while the exterior of the conduit wall is heated in a manner to polymerize the monomer contacting the inside surface of the conduit wall and/or by directing a beam or beams of high energy radiation such as generated by a source of atomic radiation, Van DeGaff generator or the like against the wall of the conduit from the interior and/or exterior thereof. A monomer vapor may be made to fill or flow through the conduit while an electrode disposed in the central portion of the conduit is energized and generates a so called electron glow discharge to ground defined by the conducting walls of the metal conduit. The glow discharge causes the monomer to deposite and polmerize in situ on the wall of the conduit. The electrode, which may comprise a wire or rod may be slowly moved through the conduit as the monomer therein is flowed or may extend the length of the conduit and deposit the monomer which is polymerized in situ without longitudinal movement of the electrode. Depending on the configuration of the conduit, it may be desireable to predeterminately move the electrode radially within the conduit during the coating procedure such as cause same to scan in a path parallel to the surface of the conduit wall so that the electrode is always closest to a particular strip area of the surface of the conduit on which the monomer is being deposited and polymerized.

(IV) In still another technique, the interior and/or exterior surface of the conduit may be predeterminately coated with a polymer by bringing same into contact with a monomer disposed thereagainst as described or by spraying or dipping said conduit into said monomer and thereafter directing intense radiation against the monomer so coated on the surface of the conduit so as to polymerize said monomer and define a solid coating thereof of desired thickness. The intense polymerizing radiation may be generated by an electron gun or a laser as a beam which beam is predeterminately scanned across the surface or surfaces being so coated and/or the conduit moved with respect to the means generating the radiation to effect the desired results. Accordingly, the laser or electron gun or beam deflection means may be predeterminately moved through the conduit to effect the desired scanning of the monomer disposed against the surface of the conduit and the procedure may be effected during a single or plurality of passes through the conduit or exterior thereof. During such scanning, the monomer may have been previously coated on the wall of the conduit by the means described including flowing, spraying or other means or may be deposited against the area being scanned by flowing or spraying thereon from a nozzle positioned adjacent the radiation source and movable therewith on the same mount so that the monomer is polymerized as or immediately after it is deposited.

Other forms of radiation may be utilized to polymerize the monomer in situ on the surface on which it is deposited such as ultrasonic energy applied to the wall of the conduit and therethrough to the monomer, microwave or radio frequency energy or interrupted, high frequency magnetic fields applied to the conduit from the outside and/or inside thereof.

Reference is made to U.S. Pat. 3,278,265 for details of a process for the manufacture of hydrogen fluoride applicable to the described method wherein the surface of an aluminum conduit or coating is converted to aluminum fluoride by the means described for the purposes described above. Such surface layer conversion may be enhanced or speeded up by the simultaneous application of radiant or vibrational energy to the substrate being so converted by the means described above. In other words, a laser, electron gun or other radiant energy generating means may direct its energy as a beam or beams against the surface or surfaces being so converted and/or vibrational energy generated by an ultrasonic transducer coupled to said substrate, intermittent magnetic field generating means or other means may also be used to improve or increase the rate of conversion of the surface strata of said substrate.

I claim:

1. A method of forming a protective coating on the inside surface of a fluid conduit having an elongated passageway therethrough with a first opening defining an inlet to said conduit and a second opening defining an outlet therefrom, said method comprising the steps of coupling a fluid dispensing means to said inlet opening in said conduit, connecting said dispensing means to a source of fluent material, flowing said fluent material from said source through said dispensing means and into said conduit opening, and while said fluent material flows through said passageway, causing said fluent material to form a coating only in the area of contact with the inside surface of said conduit which coating increases in thickness with time as the flow of said fluent material continues through said passageway, continuing to flow said fluent material through said passageway until the thickness of said layer increases a predetermined degree, terminating the flow of said fluent material when said layer has reached a predetermined thickness and purging the fluent material which has not formed said coating by causing it to flow out said second opening.

2. A method in accordance with claim 1, whereby the purging of said fluent material remaining in said passageway after the coating has reached a predetermined thickness is effected by flowing a gas through said passageway defined by said conduit in a manner to cause the flow of said fluent material from said second opening in said conduit.

3. A method in accordance with claim 1, whereby said fluent material is a polymer, said method further including rendering said polymer molten and injecting said polymer under pressure through said dispensing means into said conduit and causing a layer of said polymer to solidify and form a coating on the inside surface of said conduit.

4. A method in accordance with claim 1, whereby said conduit is made in part of an oxidizable metal and said fluent material is an oxidizing chemical capable of combining with and converting the surface of said metal of said conduit to an oxide of said metal, said method further comprising sealing said fluent material dispensing means to the wall of said first opening and thereafter feeding said fluent material from said dispensing means into said conduit and heating said metal to a temperature sufficient to convert the inside stratum of the metal of said conduit to a non-conducting compound of said metal.

5. A method in accordance with claim 1, whereby said source of fluent material includes means for delivering a plastic monomer to said dispensing means, said method including depositing said monomer against the inside surface of the wall of said conduit so as to form a layer of monomer thereon, and converting said monomer layer to a polymer to form a coating of predetermined thickness on said inside surface.

6. A method in accordance with claim 1 whereby said fluent material is a powdered polymer, said method further including heating said conduit to render the particles of said polymer molten in the area of contact with the wall of said conduit and to form a layer of said polymer on said conduit wall, and solidifying said molten polymer to form a protective coating of said conduit wall.

References Cited

UNITED STATES PATENTS

| 2,993,819 | 7/1961 | Nessim | 148—6.3 XR |
| 3,186,860 | 6/1965 | Jones | 117—97 XR |
| 3,376,152 | 4/1968 | Okomoto et al. | 117—97 XR |

FOREIGN PATENTS

| 466,997 | 8/1950 | Canada. |
| 556,999 | 5/1957 | Belgium. |
| 844,299 | 8/1960 | Great Britain. |

WILLIAM L. JARVIS, Primary Examiner

U.S. Cl. X.R.

29—527; 117—93, 118, 212, 217; 148—6.3; 219—307, 339; 220—72; 338—258